United States Patent
Guccione et al.

(10) Patent No.: US 8,107,243 B2
(45) Date of Patent: Jan. 31, 2012

(54) PORTABLE MULTI-DEVICE POWER SUPPLY, BATTERY CHARGER, AND DOCKING SYSTEM

(75) Inventors: Darren S. Guccione, Wheaton, IL (US); Craig B. Lurey, El Dorado Hills, CA (US)

(73) Assignee: Callpod Inc., Chicago, IL (US)

( * ) Notice: Subject to any disclaimer, the term of this patent is extended or adjusted under 35 U.S.C. 154(b) by 382 days.

(21) Appl. No.: 12/209,371

(22) Filed: Sep. 12, 2008

(65) Prior Publication Data

US 2010/0067197 A1    Mar. 18, 2010

(51) Int. Cl.
*H05K 7/00* (2006.01)

(52) U.S. Cl. ........................................ 361/728; 330/285

(58) Field of Classification Search .................. 361/728; 330/285; 713/320
See application file for complete search history.

(56) References Cited

U.S. PATENT DOCUMENTS

| | | | |
|---|---|---|---|
| 5,805,398 A * | 9/1998 | Rae ................................. | 361/42 |
| 2001/0003206 A1 * | 6/2001 | Pole et al. ..................... | 713/320 |
| 2004/0085043 A1 * | 5/2004 | Germagian et al. .......... | 320/107 |
| 2005/0242882 A1 * | 11/2005 | Anderson ..................... | 330/285 |
| 2008/0231113 A1 | 9/2008 | Guccione et al. | |

OTHER PUBLICATIONS

Unpublished U.S. Appl. No. 12/108,174, filed Apr. 23, 2008.

* cited by examiner

*Primary Examiner* — Yuriy Semenenko
*Assistant Examiner* — Andargie M Aychillhum
(74) *Attorney, Agent, or Firm* — Levenfeld Pearlstein, LLC

(57) ABSTRACT

A multiple electronic device power supply, battery charger, and USB docking system has a plurality of power ports for charging/powering electronic devices and a plurality of USB ports for coupling peripheral devices to a computer or large electronic device. Electronic devices which may be charged using the present invention can require current from less than 500 mA to approximately 6 A. Voltage setting resistors in specialized adapters serve to set the voltage needed for individual devices in order to manage current and voltage distribution throughout the present invention, particularly when large and mid-sized electronic devices are connected to the present multiple device charger and docking system. Default settings set the voltage output at 24 volts if not otherwise directed.

18 Claims, 6 Drawing Sheets

PORTABLE MULTI-DEVICE POWER SUPPLY, BATTERY CHARGER, AND DOCKING SYSTEM

BACKGROUND OF THE INVENTION

The present invention is directed to a battery charging device. More particularly, the present invention pertains to a battery charging device that is able to power and/or charge both small and large devices, and has integrated docking ports which serve as USB ports for peripheral devices.

Today's technology savvy, generation has accumulated numerous electronic gadgets, from laptop computers, cell phones, and personal digital assistants, to digital cameras, portable DVD players, and the like. The list is endless. For each of these electronic devices, either a replacement battery is needed, which can be very costly, or a way to recharge the current battery. In order to recharge the current battery in each of these electronic devices, a separate battery, charger is necessary for each individual device. Not only can purchasing multiple battery chargers be costly, but it can also get messy and confusing. Generally, a battery charger consists of a outlet plug, a bulky, heavy transformer box positioned near the outlet plug, followed by a long cord that connects to the device to be charge. More often than not batter, chargers end up thrown in a drawer together until needed. Trying to untangle the resulting confusion of cords is time consuming and frustrating.

In addition to charging these devices, there are also the peripheral connectors which connect peripheral devices, such as keyboards, printers, mice, portable storage units, and the like to larger electronic devices such as computers. When two or more peripheral devices need to be connected, there can be several USB buses, cords, and connectors involved. The number of devices, battery chargers cords, and adapters for connecting to other devices can be enormous.

Accordingly, there is a need for a device and system that minimizes the number of electronic device chargers needed, minimizes the number of electrical outlets needed to provide current/voltage to the chargers, increases the number of peripheral devices that can be connected simultaneously to a USB compatible bus, and organizes the charging devices and docking systems into one convenient, tidy package.

BRIEF SUMMARY OF THE INVENTION

A portable, multiple electronic device power supply, charger, and USB docking system has a plurality of power ports for powering or charging electronic devices and a plurality of USB ports for coupling peripheral devices to a computer or other electronic device. The present system may be used to power or charge electronic devices requiring current from less than 500 mA to approximately 6 A. Voltage setting resistors in specialized adapters serve to regulate the voltage needed for individual devices. The present system manages current and voltage distribution and is particularly useful when large and mid-sized electronic devices are connected to the present system. The present system conserves as well as distributes power, without the need for multiple wall plugs, multiple wall outlets, multiple car plugs, or multiple transformers for each electronic device. The present system uses a single wall or car outlet to power/charge the present invention and subsequently and/or simultaneously power/charge multiple devices simultaneously. Default settings can set the voltage output of the power converter at a desired voltage, such as 24 volts, if not otherwise directed.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
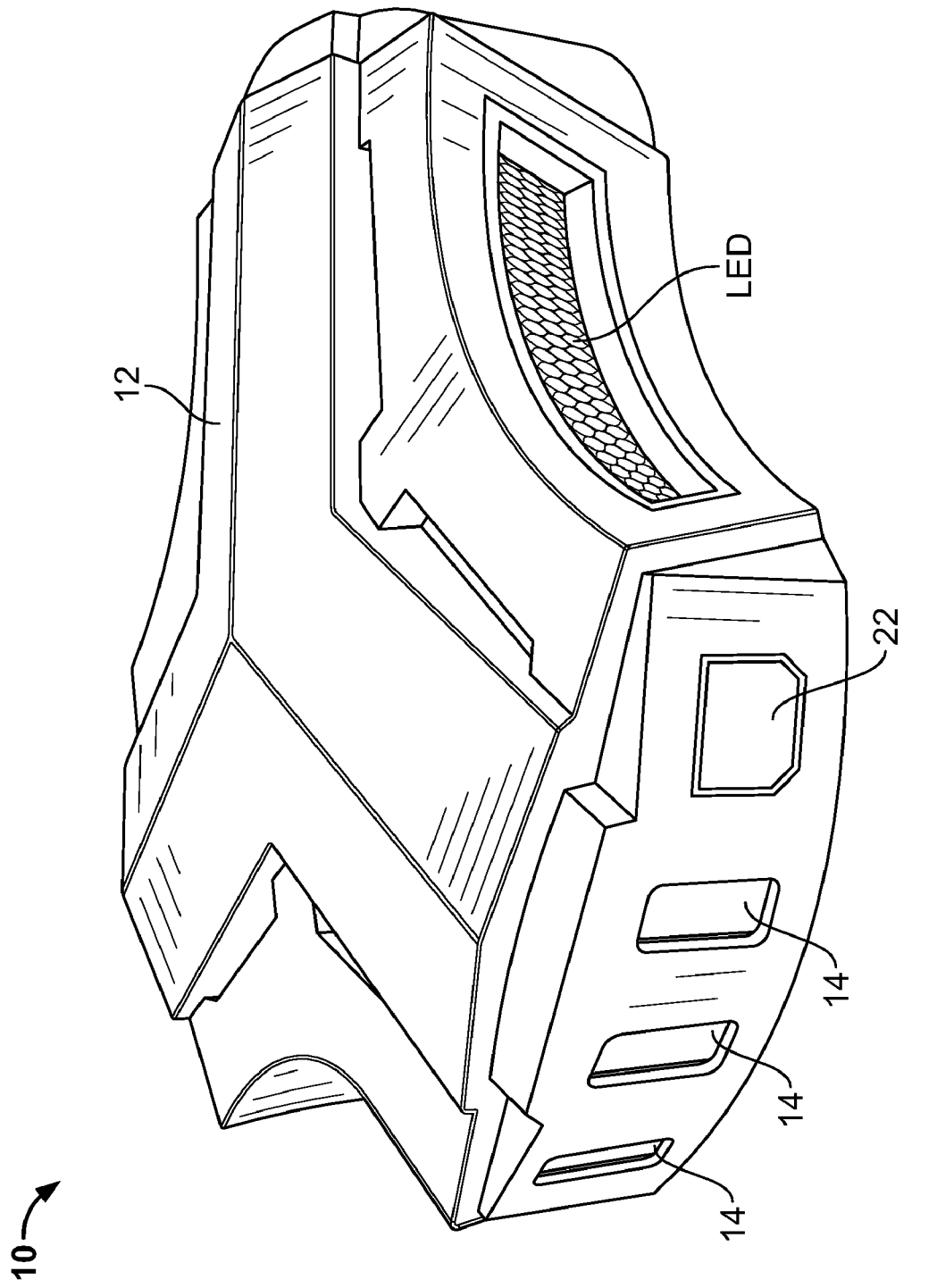
FIG. 1 illustrates a perspective view of the portable multi-device charger and docking system in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A portable electronic power supply and battery charger of the present invention is configured to power/charge multiple small electronic devices simultaneously, such as those requiring 500 mA or less, as well as medium and larger devices requiring a greater amount of current, from 500 mA to 6 A or more. In addition, the portable power supply and battery charger of the present invention also includes docking ports, in particular USB ports, for coupling peripheral or other electronic devices to each other. The present invention is also capable of directly powering a device regardless of the presence of a batter in the device needing power. Thus, in the present context, the present battery charger also can be configured as a power supply. The terms battery charger and power supply may be used interchangeably in the present application.

Figure 2:
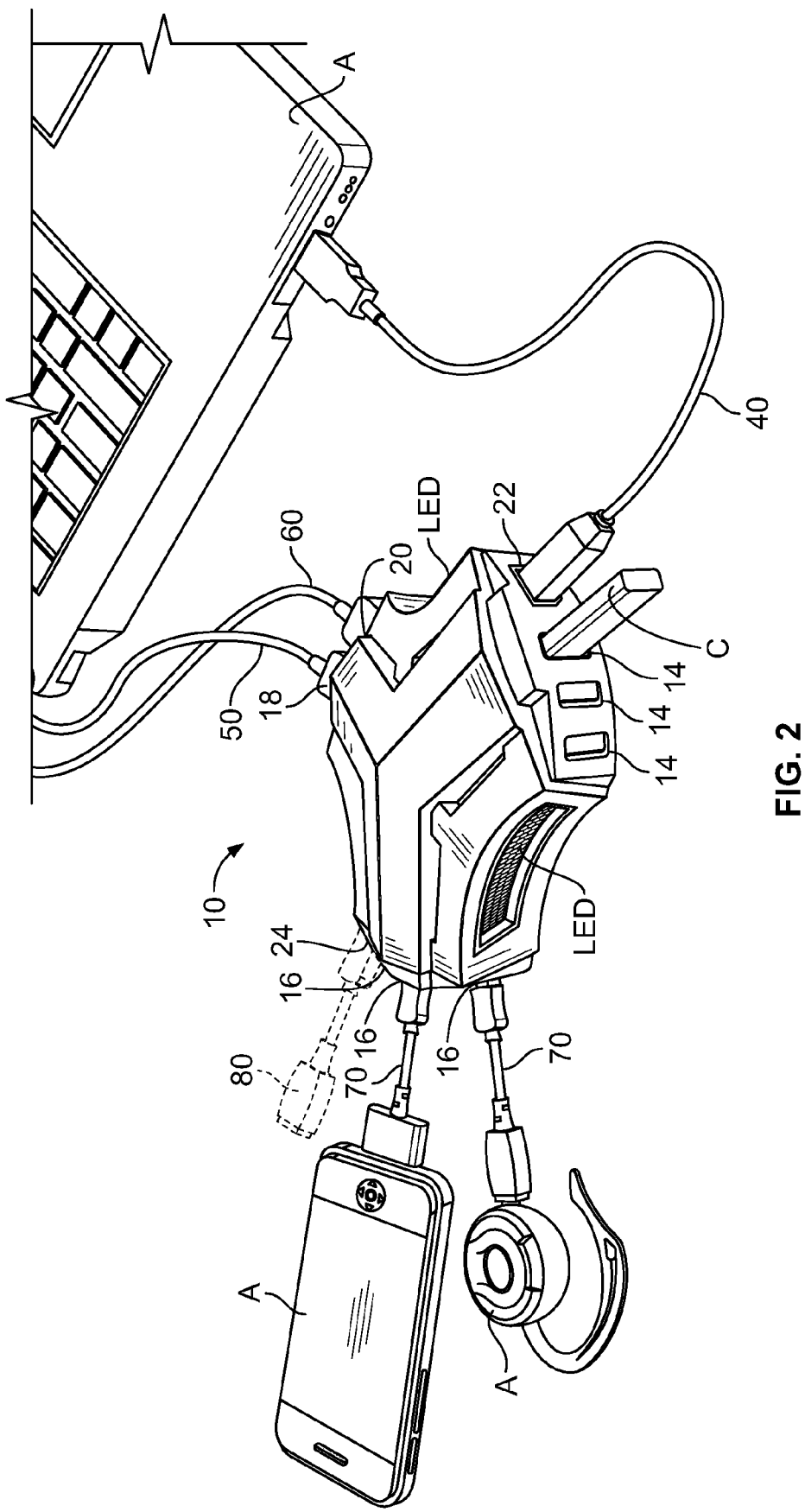
FIG. 2 illustrates a perspective view of the portable multi-device charger and docking system shown charging several small electronic devices and a laptop computer and utilizing the USB port to connect an ancillary storage device to a laptop computer.

Turning now to the figures and in particular FIG. 1, there is illustrated an embodiment of the present multiple device power supply, charger, and docking system (hereafter charging unit) 10 while FIG. 2 illustrates an example of the charging unit 10 in use. The charging unit 10 in the present example has a housing 12 with multiple ports including input port 20, small electronic device ports 16, medium electronic device port 24, large electronic device port 18, and USB ports 14. (Hereafter, the device ports are collectively referred to as power ports). The charging unit 10 in FIG. 2 is connected to two small electronic devices A at its power ports 16. In addition, the charging unit 10 is also connected to a USB storage device C at one of the USB ports 14 and a laptop computer D at large electronic device power port 50. In addition, the laptop computer D is connected to the peripheral device C through connection port 22. The charging unit 10 housing 12 also has several LED (light emitting diodes) on the sides of the housing and at each of the ports for illumination of the ports.

Each device is connected to the charging unit 10 through adapters. For example, the small electronic devices A are connected to the charging unit 10 through adapters 70. The laptop computer D is coupled to the charging unit 10 through power adapter 50 and USB adapter 40. The medium sized electronic device, in the present context, (not shown) would be coupled to the charging unit 10 through adapter 80.

Figure 3:
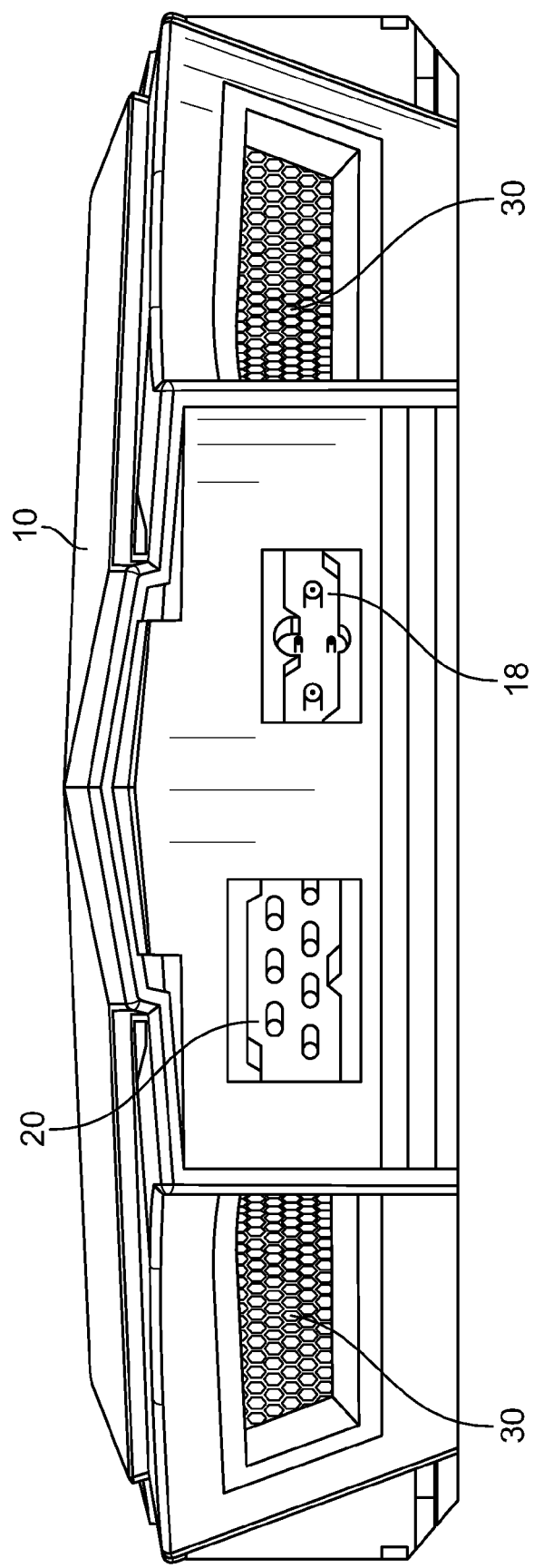
FIG. 3 is a first side view of the present charger and docking system.
Figure 4:
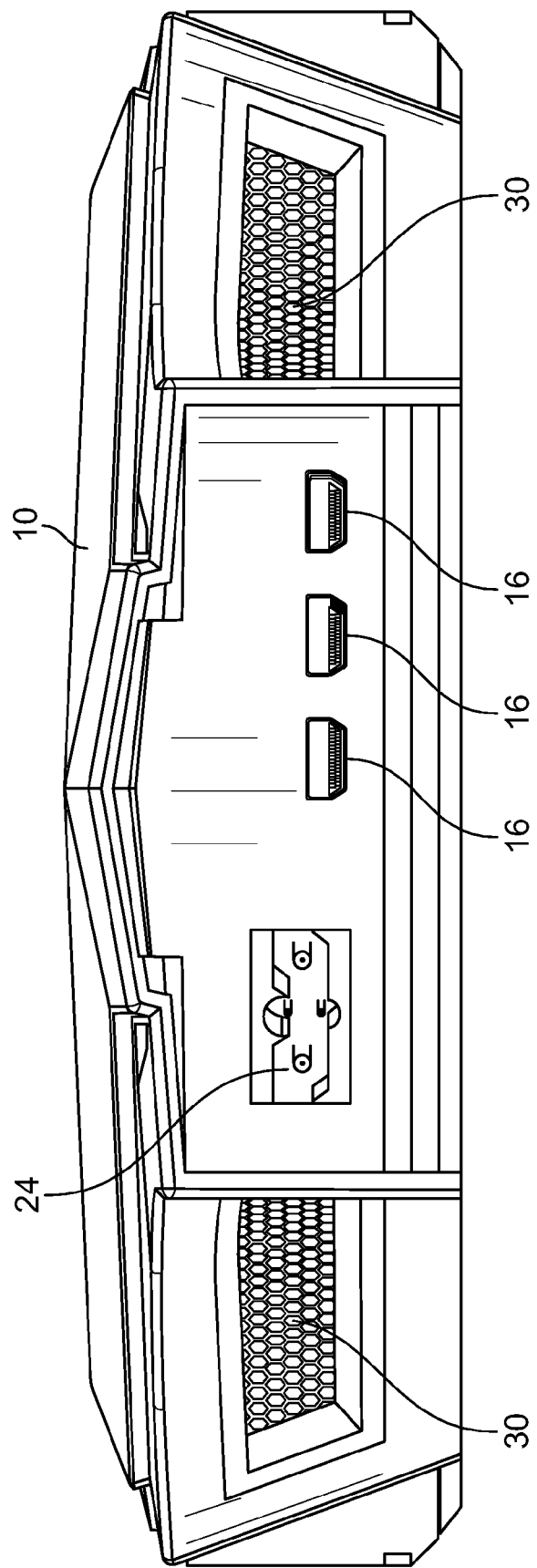
FIG. 4 is a second side view of the electronic device input for the present charger and docking system.
Figure 5:
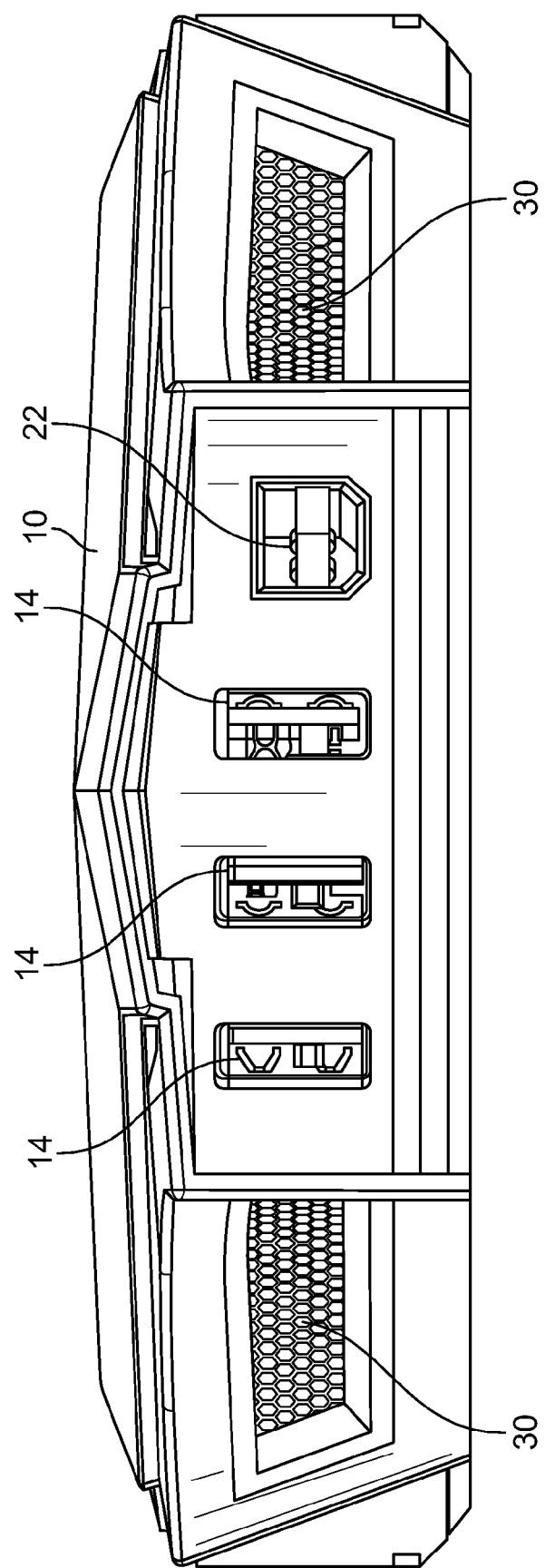
FIG. 5 is a third side view of the USB input for the present charger and docking system.

FIGS. 3-5 are side views of the housing 12 showing various input and output ports of the charging unit 10. In FIG. 3, the charging unit 10 of the present invention receives power through input port 20, either 120/240V AC or through 12V DC (such as a car charger). Power port 18 is configured for charging large electronic devices including, but not limited to, laptop computers. A large electronic device, in the present context, refers to an electronic device requiring approximately 2 A to approximately 6 A or more of current.

In FIG. 4, power ports 16 for three small electronic devices are shown with a power port 24 configured for a medium sized electronic device. A small electronic device refers to one that requires approximately 500 mA or less of current, such as wireless Bluetooth headsets, cellular phones, smart phones, personal digital assistants, multimedia players, and the like. A medium sized device, in this context, refers to those devices requiring between approximately 500 mA and 2 A of current, including, but not limited to portable DVD players, digital cameras, video cameras, navigational units, portable gaming systems, and the like.

In FIG. 5, three USB ports 14 are shown with a USB data transfer port 22 for data transfer from/to another electronic device such as a computer D. While in a present embodiment, USB ports are shown, it is understood, and those skilled in the art will recognize, that other USB-type buses, such as mini-USB ports and the like, may be used without departing from the scope of the present invention. The USB ports 14 are configured to support such peripheral devices as keyboards, mouse, printers, USB storage devices, portable hard drives, and the like. As shown, each side of the charging unit 10 is configured with LEDs 30 for illumination and each of the ports also are configured with LEDs such that the port opening is illuminated. If it is desired to have the LEDs dimmed or completely off, such as during the night, a dimmer/on/off switch 95 is also configured in the charging unit 10.

While the present example shows the present multi-device charger and docking system 10 having three power ports 16 to charge small electronic devices, and one medium and one large device, this is not intended to limit the number or type of device that can be serviced by the present invention. It is understood that the present invention may be configured to charge more or less than three small devices and/or one medium and/or one large device. It is also understood that more or less USB ports may be present and all are within the spirit of the present invention. In addition to charging batteries, the present invention can also serve as a direct power source to electronic devices, such as laptops, regardless of whether a battery is present in the device needing power.

Figure 6:
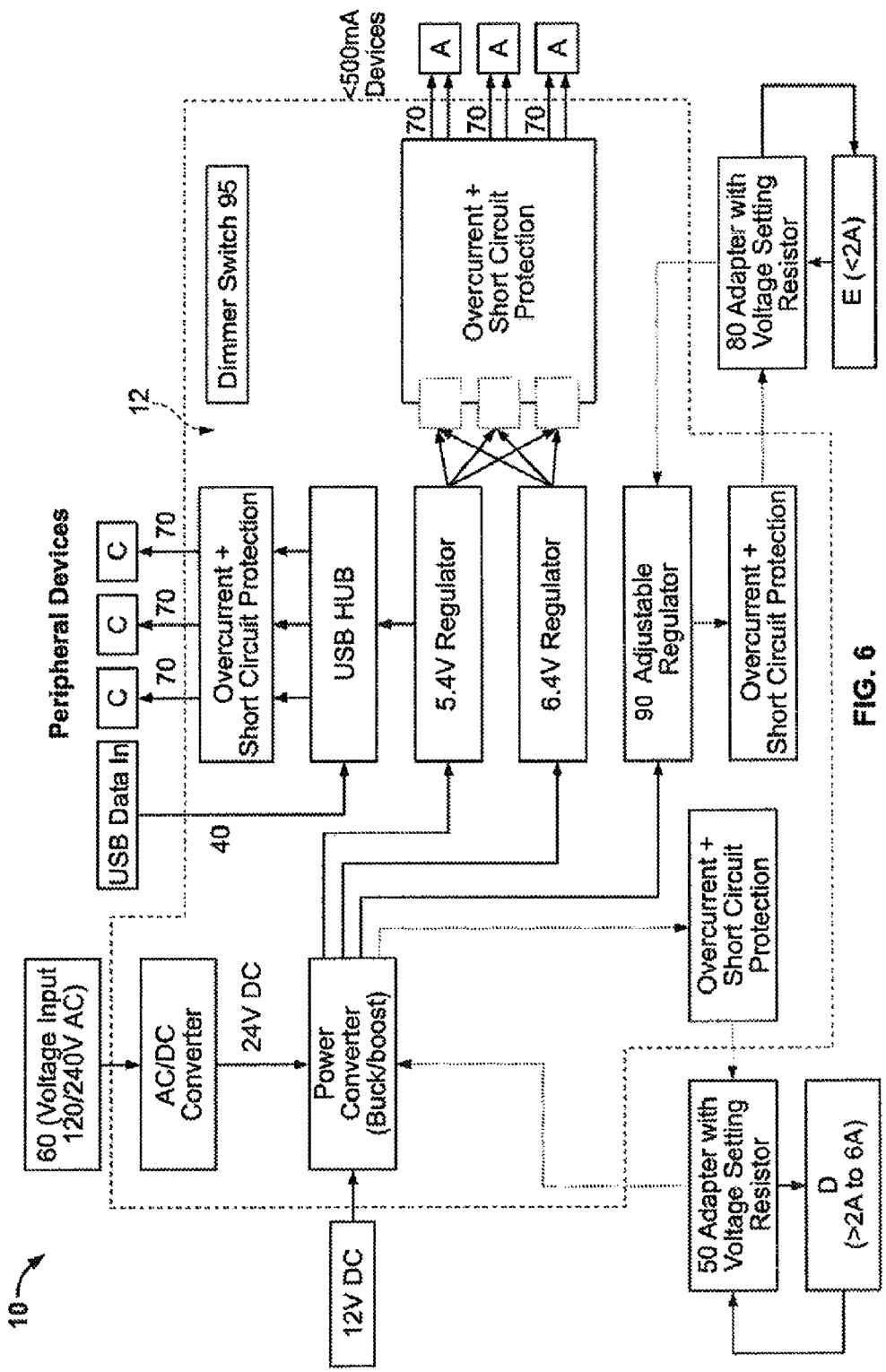
FIG. 6 is a schematic block diagram that may be used to couple multiple electronic devices to the present multi-device charger and docking system.

FIG. 6 shows a schematic block diagram that may be used to couple multiple electronic devices and multiple peripheral devices to the present charging unit 10. The charging unit 10 receives power from a 120/240 VAC source, which is converted to direct current through an AC/DC converter. The charging unit 10 may also be powered directly from a 12V DC source (such as a car charger). A power converter, in the present example a buck/boost converter, is used to adjust the voltage needed for the load (i.e. the electrical devices being charged), depending on the magnitude of current required by the devices coupled to the charging device and docking system 10. The buck-boost converter of the present embodiment is a type of converter that has an output voltage magnitude that can be greater than, equal to, or less than the input voltage magnitude. The default value for output voltage at the buck/boost converter in a present embodiment is 24V DC.

The output voltage from the power converter (default is 24V) is divided amongst the load coupled to the charging unit 10 according to their individual requirements. In the present example, the 5.4V regulator feeds the USB bus. The 6.4V regulator feeds the small power ports such that small electronic devices may be charged, and the adjustable regulator is configured to feed medium sized devices E at the corresponding power port.

As shown in FIGS. 3-6, the charging unit 10 has multiple power ports 16, 18, 24 for electronic devices A, C, D, and E to be charged. Each set of power ports 16, 18, 24 has short circuit and over-current protection provided. In addition, the AC-to-DC converter is located within the housing 12, rather than outside the housing 12 as traditional chargers are configured. Therefore, no bulky heavy transformers are necessary outside the housing, as are required in prior art devices.

In order for the charging unit 10 to be able to simultaneously charge small, medium, and large devices, the charging unit 10 works in conjunction with power adapters. The adapters couple the electronic devices to the charging unit. In addition, voltage regulator signals or inputs, such as that provided by voltage setting resisters, within the adapters signal the presence of a large or medium sized electronic device that requires additional current/voltage. In a preferred embodiment, adapters are specific for each manufacturer of device, such that, for example, a laptop computer from one manufacturer may signal voltage requirements that are different from an adapter configured for a second manufacturer of laptop computers.

In the present embodiment, the adapter 50 includes a voltage setting resistor that signals the power converter (the buck/boost converter in this example) of the presence of an electronic device requiring additional voltage. The voltage output of the buck/boost converter is then regulated such that the output voltage can be divided to adequately feed the load. Similarly, when an adapter is coupled to power port 24, the voltage setting resistor in the adapter 80 signals the adjustable voltage regulator 90 of the presence of an electronic device requiring additional voltage. The adjustable voltage regulator 90 compensates and provides an output voltage compatible with the needs of the medium sized electronic device E coupled to the adapter 80. In addition, the dimmer switch 95 may be provided to dim or turn off the LED lights as desired.

The advantages of the present invention are clear. Rather than having a charging device with a fixed voltage output configured to charge only a few devices, the present invention allows multiple different electronic devices to be charged simultaneously with the use of adapters, voltage dividers, and adjustable voltage regulators. In addition, the present invention minimizes the number of electronic device chargers needed, minimizes the number of electrical outlets needed to provide current/voltage to the charging unit, increases the number of peripheral devices that can be connected simultaneously to a USB compatible bus, and organizes the charging devices and docking system into one convenient, tidy package.

All patents referred to herein, are incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A portable multiple electronic device power supply, battery charger, and docking system comprising:
   a power circuit configured to simultaneously power a plurality of electronic devices;
   a plurality of fixed voltage regulators electrically coupled to the power circuit;
   a plurality of adjustable voltage regulators electrically coupled to the power circuit;
   a plurality of first power ports each electrically coupled to at least one of the plurality of fixed voltage regulators;
   a plurality of second power ports each electrically coupled to at least one of the plurality of adjustable voltage regulators;
   an integral USB hub electrically coupled to at least one of the plurality of fixed voltage regulators, the USB hub having one or more USB ports;
   wherein an output voltage of each adjustable voltage regulator is based on a voltage regulating input received from each electronic device coupled to each of the corresponding second power ports.

2. The system in accordance with claim 1 wherein the power circuit provides both overcurrent and short circuit protection.

3. The system in accordance with claim 1 further comprising a housing.

4. The system in accordance with claim 1 wherein the circuit has a dimmer switch.

5. The system in accordance with claim 1 wherein the system is configured to power a first device requiring less than 500 mA of current and a second device requiring more than 500 mA of current.

6. The system in accordance with claim 1 wherein the system is configured to power a first device requiring less than 500 mA of current and a second device requiring between 500 mA and 6 A of current.

7. The system in accordance with claim 1, wherein the power circuit further comprises a power converter.

8. The system in accordance with claim 1 further comprising at least one data transfer port.

9. The system in accordance with claim 1 wherein an adapter couples each second power port to the corresponding electrical device.

10. A circuit for powering a plurality of electronic devices and a USB hub simultaneously, the circuit comprising:
    a power converter;
    a plurality of voltage setting resistors each electrically coupled to the power converter and to at least one of the plurality of electronic devices;
    a plurality of fixed voltage regulators electrically coupled to the power converter; and
    a plurality of adjustable voltage regulators electrically coupled to the power converter,
    wherein one of the fixed voltage regulators simultaneously provides a voltage to a USB hub and to at least one of the plurality of electronic devices, and
    wherein an output voltage of each of the plurality of adjustable voltage regulators is based on an input signal received from at least one voltage setting resistor when a corresponding electrical device is coupled to the voltage setting resistor.

11. The circuit in accordance with claim 10 further comprising an overcurrent protection circuit.

12. The circuit in accordance with claim 10 further comprising a short-circuit protection circuit.

13. The circuit in accordance with claim 10 further comprising at least one data transfer port.

14. The circuit in accordance with claim 10 wherein each voltage setting resistor is coupled to the corresponding electrical device by an adapter.

15. An electronic device docking system comprising:
    a power circuit configured to simultaneously power a plurality of electronic devices via a plurality of power ports;
    a data transfer port for data transfer from and/or to at least one electronic device;
    at least one fixed voltage regulator for providing an output voltage to at least one of the power ports; and
    at least one adjustable voltage regulator for receiving a voltage regulating input and adjusting an output voltage provided to at least one of the power ports based on the voltage regulating input.

16. The electronic device docking system of claim 15 wherein the voltage regulating input is received from an adapter configured to couple an electronic device to at least one of the power ports.

17. The electronic device docking system of claim 16 wherein the voltage regulating input is received from at least one voltage setting resistor coupled to the adapter.

18. The electronic device docking system of claim 15 further comprising a housing, wherein the power circuit includes a power converter and is disposed within the housing.

* * * * *

UNITED STATES PATENT AND TRADEMARK OFFICE
CERTIFICATE OF CORRECTION

PATENT NO. : 8,107,243 B2
APPLICATION NO. : 12/209371
DATED : January 31, 2012
INVENTOR(S) : Darren S. Guccione and Craig B. Lurey Page 1 of 1

It is certified that error appears in the above-identified patent and that said Letters Patent is hereby corrected as shown below:

In column 1, line 12, the phrase "Today's technology savvy, generation" should read "Today's technology savvy generation".

In column 1, line 20, the phrase "a separate battery, charger" should read "a separate battery charger".

In column 1, lines 23-24, the phrase "of a outlet plug" should read "of an outlet plug".

In column 1, line 26, the phrase "More often than not batter, chargers" should read "More often than not, battery chargers".

In column 1, line 37, the phrase "battery chargers cords" should read "battery chargers, cords".

In column 2, line 53, the phrase "a batter" should read "a battery".

Signed and Sealed this
Twelfth Day of June, 2012

David J. Kappos
*Director of the United States Patent and Trademark Office*